(12) United States Patent
Quek (10) Patent No.: US 6,664,953 B2
(45) Date of Patent: *Dec. 16, 2003

(54) METHOD AND RECEPTACLE FOR RECEIVING AND RELEASING A PEN

(75) Inventor: Soo Huat Quek, Singapore (SG)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 80 days.

(21) Appl. No.: 09/130,026

(22) Filed: Aug. 6, 1998

(65) Prior Publication Data

US 2002/0003532 A1 Jan. 10, 2002

(51) Int. Cl.$^7$ ................................. G09G 5/00
(52) U.S. Cl. ............... 345/179; 179/18.01; 361/683
(58) Field of Search ................. 345/173, 179; 178/18.01, 19.01, 19.03, 19.04, 19.05; 364/708.1, 709.01; 361/683, 680

(56) References Cited

U.S. PATENT DOCUMENTS

| | | | | |
|---|---|---|---|---|
| 4,222,462 A | * | 9/1980 | Ottestad | 173/210 |
| 4,564,078 A | * | 1/1986 | Enokido et al. | 178/18 |
| 4,884,642 A | * | 12/1989 | Fadeev et al. | 173/133 |
| 4,927,986 A | * | 5/1990 | Daly | 178/18 |
| 5,067,573 A | * | 11/1991 | Uchida | 178/18 |
| 5,180,891 A | * | 1/1993 | Trumbo | 178/18 |
| 5,290,972 A | * | 3/1994 | Someya et al. | 178/18 |
| 5,434,373 A | * | 7/1995 | Komaki | 178/87 |
| 5,587,560 A | * | 12/1996 | Crooks et al. | 178/18 |
| 5,646,649 A | * | 7/1997 | Iwata et al. | 345/173 |
| 5,665,071 A | * | 9/1997 | Wyrick | 604/134 |
| 5,760,347 A | * | 6/1998 | Notarianni et al. | 178/18 |
| 5,798,494 A | * | 8/1998 | Aoyama et al. | 219/98 |

* cited by examiner

Primary Examiner—Kent Chang
(74) Attorney, Agent, or Firm—Richard Main (57) ABSTRACT

Pen receptacles for storing and easy ejecting of pens without the pens overshooting the receptacles are described. In one embodiment, the pen has a tapered surface which interacts with a pair of gripping arms to modulate the deceleration of an ejecting pen. In a second embodiment using a relatively straight pen, a constriction is added to a chamber of a receptacle to affirmatively decelerate an ejecting pen. In both the embodiments, the pens decelerate to rest with a portion of each pen inside the receptacles. Exposed portions of the pens allow a user to comfortably grip the pens to draw them out of the receptacles.

4 Claims, 8 Drawing Sheets

METHOD AND RECEPTACLE FOR RECEIVING AND RELEASING A PEN

FIELD OF INVENTION

This invention relates to a pen receptacle for receiving an input pen such as, for example, a stylus for use in inputting information into a personal computer or the like.

BACKGROUND

With increasing demand for personal computers (PC's) which are portable, stylus or pen-based data entry means has become more popular and essential. An example of such a PC is the increasingly popular computerized personal organizer. This organizer performs such personal information management functions as keeping calendars, address books, to-do lists, and other similar functions. While conventional computer systems can provide these functions, personal organizers, which are relatively inexpensive, small, lightweight and portable, can provide these functions.

As these organizers are usually made small, the accompanying keyboards are also miniaturized and therefore not convenient for entering data. In such cases, styluses or pens are preferred to the keyboards as data entry means. These pens are also used very much like a computer mouse to launch and select menus in software applications running on the organizers. Thus the pen has become an essential part of the personal organizer. And it is preferable to securely accommodate the pen in a receptacle in the housing of the personal organizer.

The pen is usually an elongated member suitable for hand holding in a writing position. An annular groove on the pen allows a locking mechanism in the receptacle to lock the pen in a chamber in the receptacle. This pen can be used with different receptacles as will be described below.

One example of a prior art receptacle commonly found in personal organizers has an elongated chamber to house the pen. When the pen is inserted into the chamber, an annular constriction in the chamber engages the groove on the pen to retain the pen in the chamber. An exposed end of the pen having a ridged surface allows a user to drag the pen with a thumb or a finger to draw it out of the chamber. This receptacle has a few disadvantages. The constriction and pen groove engagement does not usually retain the pen securely in the receptacle and thus makes the pen prone to be accidentally dislodged during transportation. If however the constriction and pen groove engagement does securely retain the pen, it then becomes cumbersome for a user to draw the pen out of the chamber by dragging on the exposed end of the pen using a finger.

Figure 1:
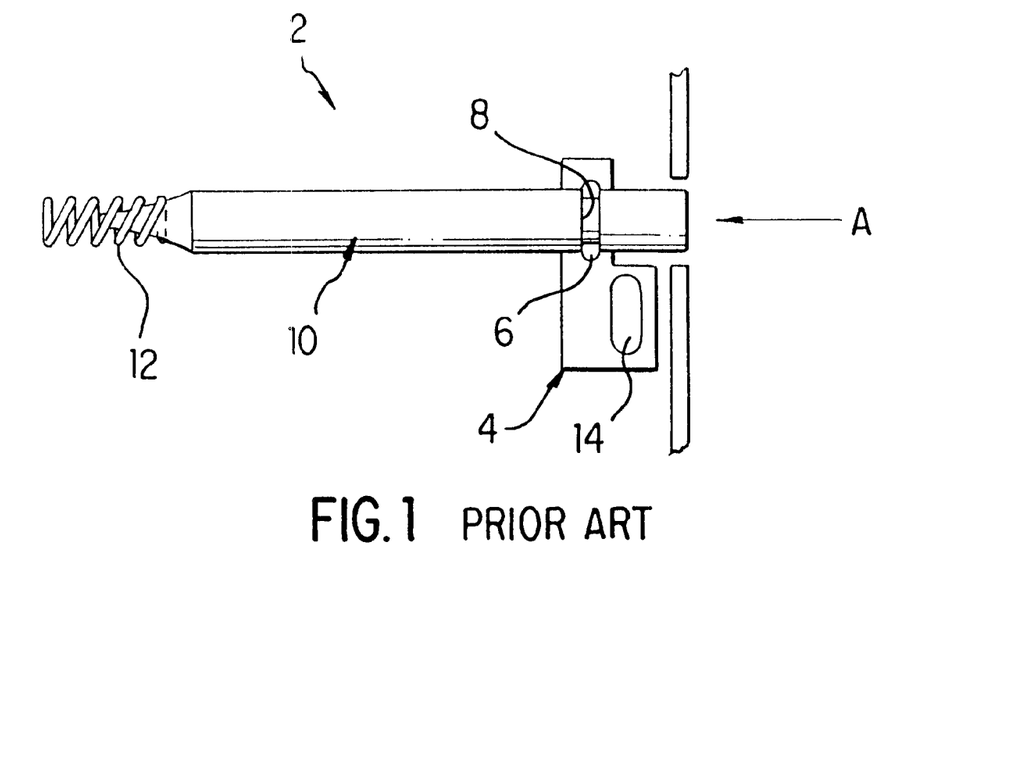
FIG. 1 is a top view of a prior art pen and receptacle showing the pen inserted into the receptacle in a locked position and with a spring loaded and ready to expel the pen when the pen is released from the locked position.
Figure 2:
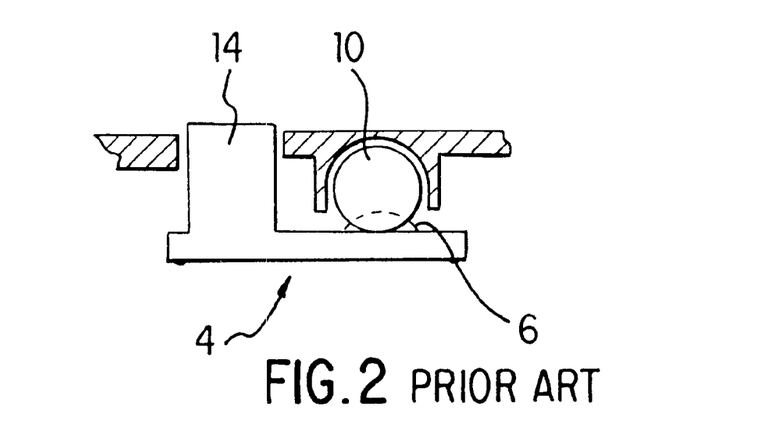
FIG. 2 is a side view taken in the direction of an arrow A in FIG. 1 showing a locking mechanism which locks the pen in the receptacle of FIG. 1.

FIG. 1 and FIG. 2 show a second prior art receptacle 2. This receptacle 2 overcomes the disadvantages of the first receptacle described above. This receptacle 2 has a locking mechanism 4 which has a hook member 6 biased to protrude into a chamber of the receptacle 2. The hook member 6 engages a groove 8 on a pen 10 when the pen 10 is inserted into the chamber. The engagement of the hook member 6 with the groove 8 securely retains the pen 10 in the chamber. The insertion of the pen 10 also loads a spring 12, which is positioned to expel the pen 10 out of the chamber. A user presses a button 14 integral with the locking mechanism 4 to release the lock on the pen to free the pen. When unlocked, the loaded spring expels the freed pen out of the chamber. This releasing action of the receptacle will require that the user has a good sense of coordination to catch the ejecting pen to prevent it from dropping and getting damaged.

Figure 3:
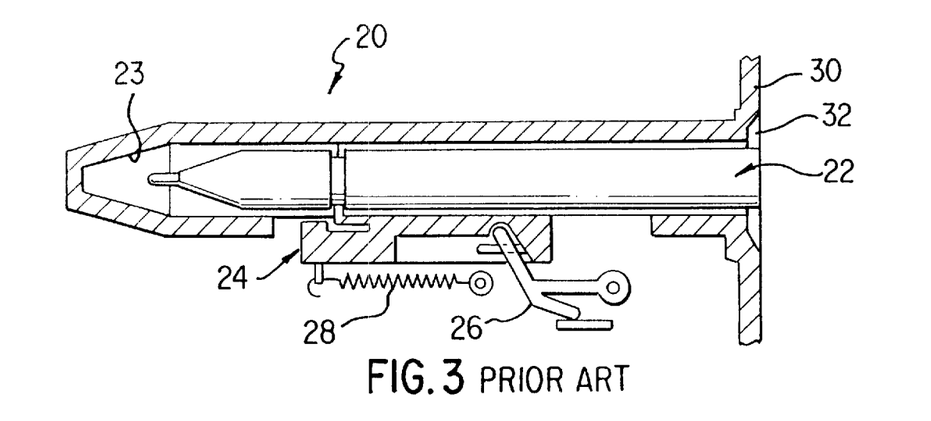
FIG. 3 is a sectional view of another prior art pen and receptacle showing the pen retained by a retaining member and the retaining member locked in a locked position in the receptacle with a spring tensioned and ready to eject the pen out when the locked retaining member is released.
Figure 4:
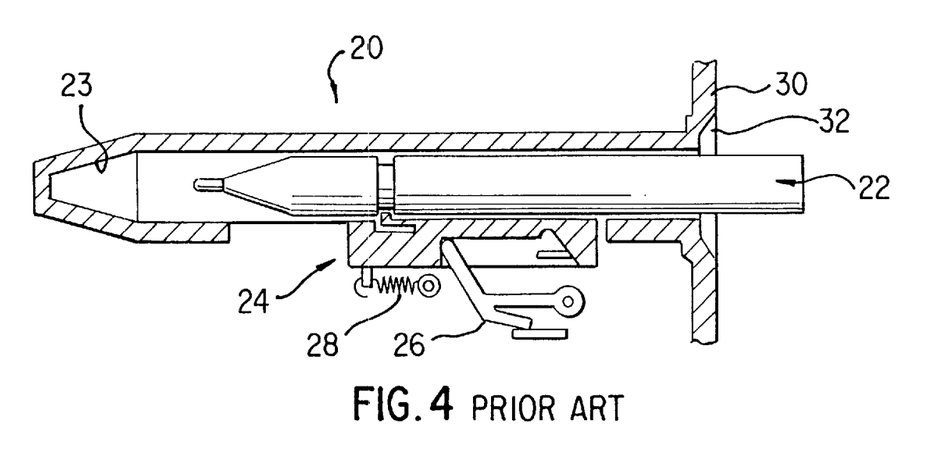
FIG. 4 is a similar view to FIG. 3 showing the pen and retaining member released from the locked position and brought to rest within the receptacle.

FIG. 3 and FIG. 4 show yet another receptacle 20 as disclosed in U.S. Pat. No. 5,434,373. This receptacle 20 prevents an ejecting pen 22 from accidental falling out of the receptacle 20. This receptacle 20 has a retaining member 24 for latching the pen 22 inside a chamber 23 of the receptacle when the pen 22 is inserted into the chamber. The receptacle also has a locking member 26 for locking the retaining member 24 at a predetermined locked position, where the pen 22 is retained inside the chamber 23. In the locked position, a spring 28 is tensioned to expel the pen 22 out of the chamber 23. To release the pen 22, a user pushes an exposed part of the pen 22 further into the chamber 23 to release the lock on the retaining member 24. The tension in the spring 28 causes the stretched spring 28 to collapse to pull the retaining member 24 and latched pen 22 outwards of the receptacle. An arm on the locking member 26 obstructs the retaining member to bring the retaining member 24 to a halt in the receptacle. During the ejecting movement, the retaining member 24 continues to latch onto the pen 22. Thus the pen 22 does not overshoot the receptacle 20 completely but comes to an abrupt stop to leave a portion of the pen 20 exposed. This exposed end allows a user to draw the pen completely out of the receptacle. This receptacle 20 has its disadvantages. When inserted into the receptacle 20, the end of the pen 22 is usually preferred to be substantially flush with an exterior 30 of the receptacle. This exterior 30 of the receptacle 20 is usually a part of a peripheral wall of a housing of a personal organizer. The finger releasing means will require that a recess 32 be built into the peripheral wall to accommodate a user's finger to allow a user to easily push the pen further into the receptacle to release the pen. This recess 32 when built into a housing usually renders the housing less aesthetically appealing. This loss of appeal puts the personal organizer using the receptacle 20 at a commercial disadvantage. There is another factor which causes a product using such a receptacle to be less appealing. When removing the pen, the finger is expected to restrict the movement of the pen 22 and guide it to a stop. However if the finger is removed immediately after the lock on the retaining member 24 is released, the ejecting movement of the retaining member 24 and pen will not be cushioned. The arm of the locking member 26 will put a jarring stop to the movement of the retaining member 24 and the pen 22. This snapping action of the pen 22 and retaining member 24 pair again degrades the commercial appeal of the personal organizer.

There is therefore a need for a quick release pen receptacle which encompasses the functions of the receptacles 2 and 20 described above. This receptacle is also required to modulate the ejecting movement of the pen such that the ejecting pen is brought to a gradual rest.

SUMMARY

In accordance with the preferred embodiments of the invention, pen receptacles are provided with gripping arms, constrictions or the like to affirmatively decelerate an ejecting pen. The pens used with these receptacles do not shoot out of the receptacles when expelled, but come to a rest with portions of the pens resting inside the receptacles. The other exposed portions of these pens allow a user to comfortably grip the pens to draw them out completely of the receptacles.

BRIEF DESCRIPTION OF DRAWINGS

The invention will be better understood with reference to the drawings, in which:

FIGS. 5A, 5B and 5C are perspective views of a clamp-shell casing which uses a pen receptacle, according to the present invention, to receive and release a pen. FIG. 5A shows the pen locked in the receptacle. FIG. 5B shows the final resting position of the pen after being ejected. FIG. 5C shows the pen completely drawn out of the receptacle.

DETAILED DESCRIPTION OF THE PREFERRED EMBODIMENTS

First Embodiment

Figure 5A:
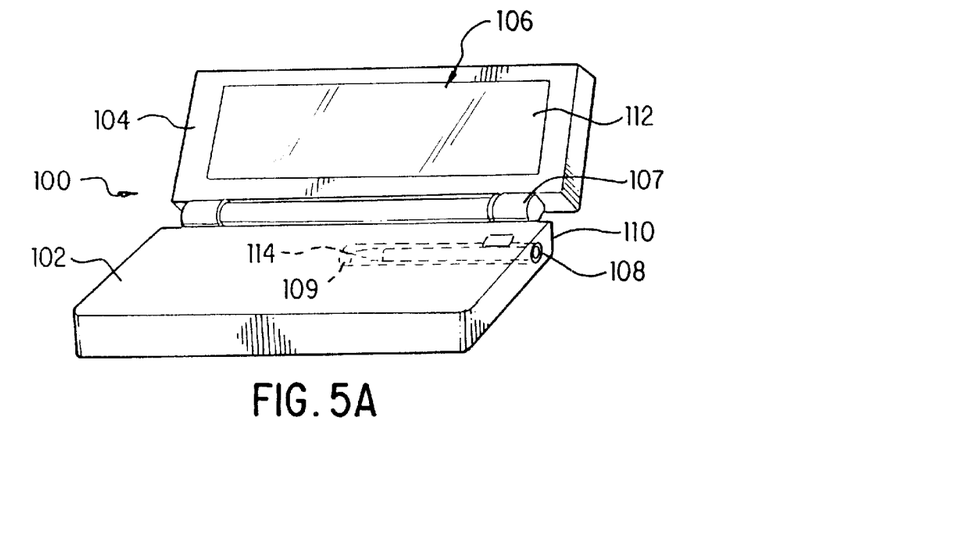
Figure 5B:
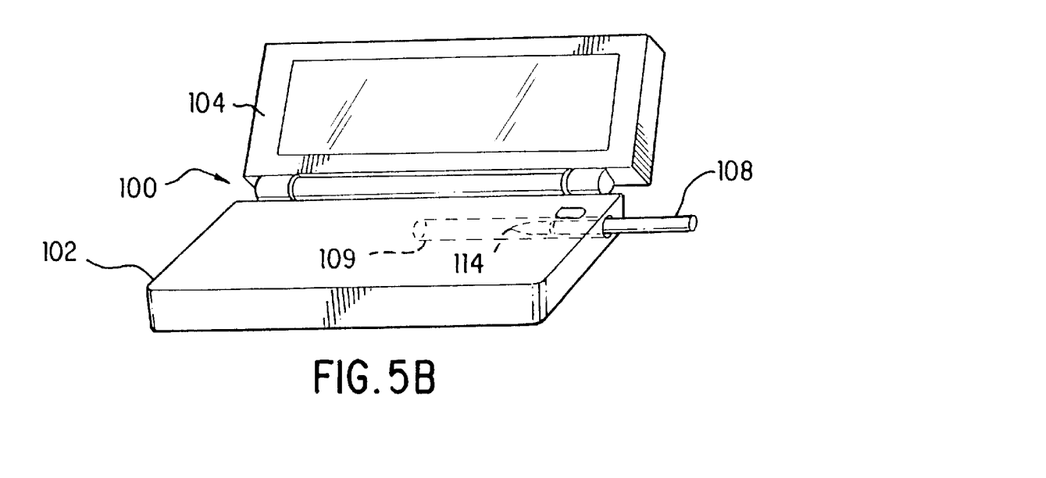
Figure 5C:
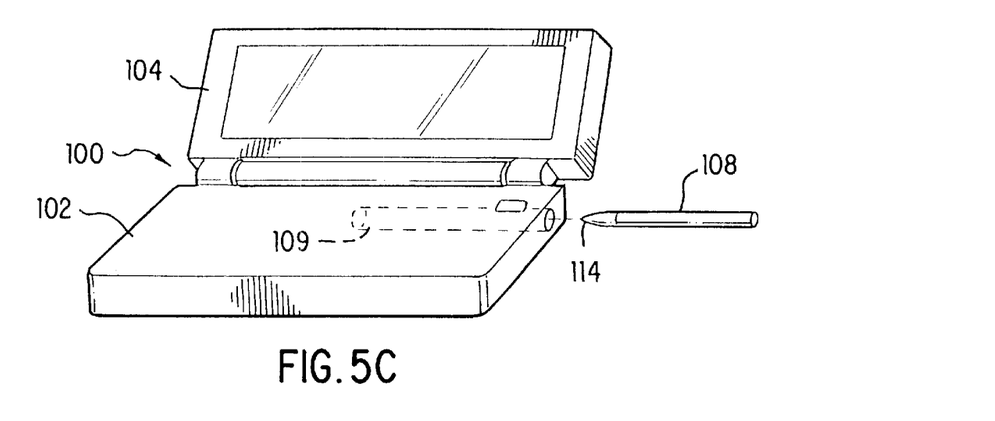

FIGS. 5A, 5B and 5C show a typical injection molded plastic clamp-shell casing assembly of a computerized personal organizer which uses a receptacle according to the invention. The casing assembly 100 has a lower casing 102 and an upper casing 104 which can be tilted over the lower casing 102. Typically the lower casing 102 contains a keyboard (not shown) and a printed circuit board assembly (PCBA) (not shown), and the upper casing 104 contains a dual-function display assembly 106. The display assembly is connected to the PCBA through cables (not shown) running from the upper casing 104 to the PCBA in the lower casing 102 through a hinge assembly 107. A pen 108 is accommodated in a pen receptacle 109 in the lower casing 102.

The dual-function display assembly 106 provides a viewing screen 112 on the upper casing 104. This display assembly 106 serves as both an input device and an output device. When operating as an input device, the display assembly 106 senses the position of a pen tip 114 on the viewing screen and provides this positional information to the computer's central processing unit (CPU) on the PCBA. When operating as an output device, the display assembly presents computer-generated images on the screen 112.

The dual-function display 106 of the computerized personal organizer permits a user to operate the organizer as a computerized notepad. For example, graphical images can be input into the pen-based organizer by merely moving the pen tip 114 across the surface of the screen 112. As the CPU senses the position and movement of the pen 108, it generates a corresponding image on the screen 112 to create the illusion that the pen 108 is drawing the image directly upon the screen 112, i.e. that the pen is "inking" an image on the screen 112. With suitable recognition software, the "ink" can be identified as text and numeric information. As a further example of a use of the pen 108, the CPU generates application specific icons on known positions of the screen 112. A user selects an appropriate application by touching an area of the display assembly directly above the icon with the pen tip 114. The CPU senses the position of the pen tip 114 on the screen 112 and launches an appropriate application as identified by the icon.

The pen 108, according to one aspect of the invention, is an elongated member. This pen 108 is generally wider along a portion of the pen and tapers towards both ends of the pen. On one end of the pen is push-fitted a pen tip 114 which is used as a writing tip. A user presses this pen tip 114 on the display assembly 106 to enter data into the computerized personal organizer or to select an icon on the display assembly 106 to launch an appropriate application. A groove 116 on the pen allows the pen to be securely locked inside the receptacle 109. FIG. 5A shows the pen 108 securely stored in the receptacle 109. A user stores the pen 108 away in the casing 100 by simply inserting the pen 108, pen tip 114 first, into the receptacle 109 until the pen 108 is fully inserted and securely stored in the receptacle 109. FIG. 5B shows the pen in a resting position after being expelled from the receptacle. To release the pen 108, the user presses a button 120 on the keyboard. The pen 108 ejects outwards of the receptacle 109 and decelerates to a gradual rest with a portion of the pen 108 protruding out of the receptacle 109. A tapered section of the pen 108 allows the deceleration of the pen to be modulated such that the pen does not come to a jarring stop. The protruding section of the pen 108 allows the user to easily draw the pen 108 out of the receptacle. FIG. 5C shows the pen 108 completely drawn out of the receptacle 109.

The casing 100 and pen 108 are of plastic, preferably a combination of polycarbonate and ABS. The pen tip is of a wear resistant plastic such as Delrin (Delrin, a trademarked plastic product from Dupont, Wilmington, Del., USA.). The retaining member 130 is of PBT.

Figure 6:
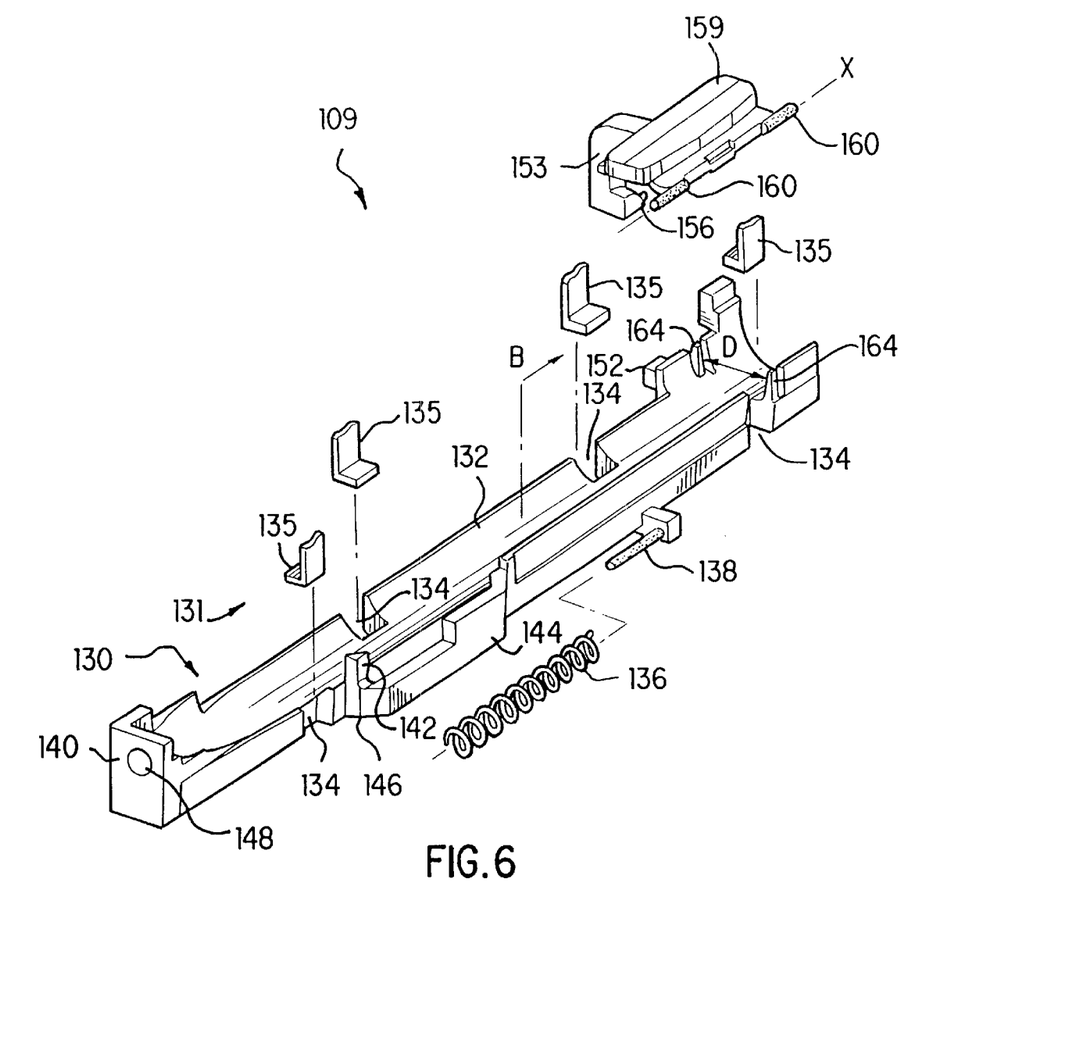
FIG. 6 is an exploded view of a receptacle according to the present invention which can be used in the casing in FIGS. 5A, 5B and 5C.

FIG. 6 is an exploded view of a receptacle 109. The receptacle 109 comprises two halves. A first half 131 (not completely shown) is molded as a part of an underside of a top surface of the lower casing 102. The second half is a separate retaining member 130. When the two halves 130 and 131 are brought together, they define a chamber 132 to accommodate the pen 108. The receptacle 109 is assembled by first placing the retaining member with slots 134 directly over matching L-section guide rails 135 which depend from the first half 131 of the receptacle 109. The retaining member 130 is then slided along the surface of the lower casing 102 in a direction given by an arrow B. The L-section guide rails 135 retain the retaining member 130 in position and allows the retaining member 103 to slide along the surface of the first half 131 of the receptacle 109. A spring 136 keeps the two halves from separating. One end of the spring 136 is attached to a spring housing (not shown) fixed on the first half 131 of the receptacle 109. The other end of the spring 136 wraps onto a spring shaft 138 on the retaining member 130. The spring 136 is compressed when assembled between the two halves 130 and 131 of the receptacle 109. This compression of the spring 136 pushes the retaining member 130 such that the slots 134 on the retaining member 130 does not coincide with the L-sections 135 on the first half 131.

On one end of the retaining member 130 is a pen tip locator 140. The locator 140 orientates the pen 108 when inserted into the receptacle 109 such that the axis of the pen 108 is substantially parallel with the axis of the chamber 132 to allow the pen to be easily ejected out of the chamber 132. The locator 140 also acts as a support for the pen 108 to prevent the pen 108 from rocking when stored in the chamber 132.

A resilient latching arm 144 extends from the retaining member 130. The latching arm 144 has a hook member 142 which is biased by the resilience of the latching arm 144 to protrude a recess 146 on the retaining member 130 into the chamber 132.

Figures 7A, 7B:
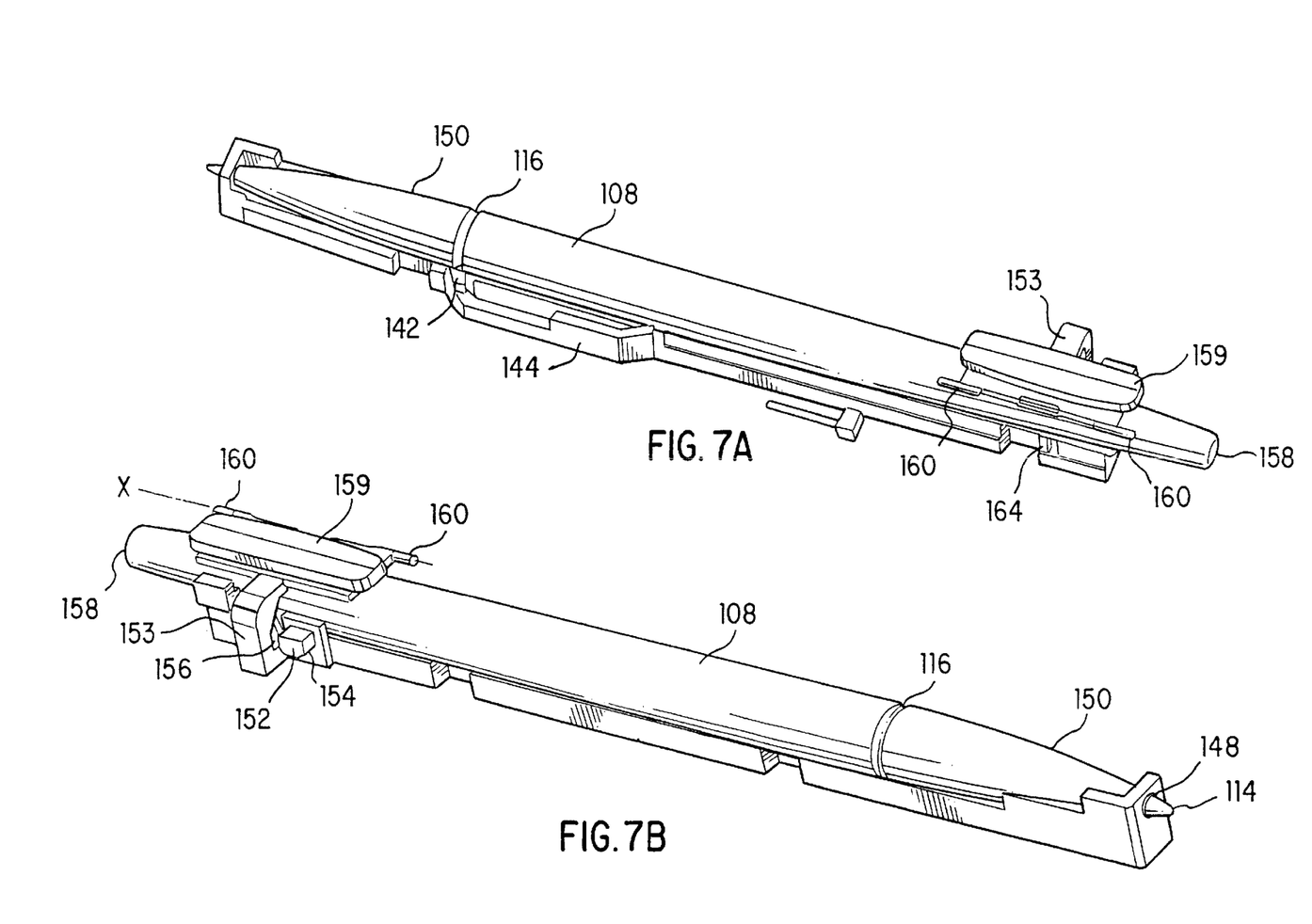
FIGS. 7A, 7B and 7C are different perspective views of the pen and receptacle in FIG. 6. The figures show the pen inserted into the receptacle.
Figure 7C:
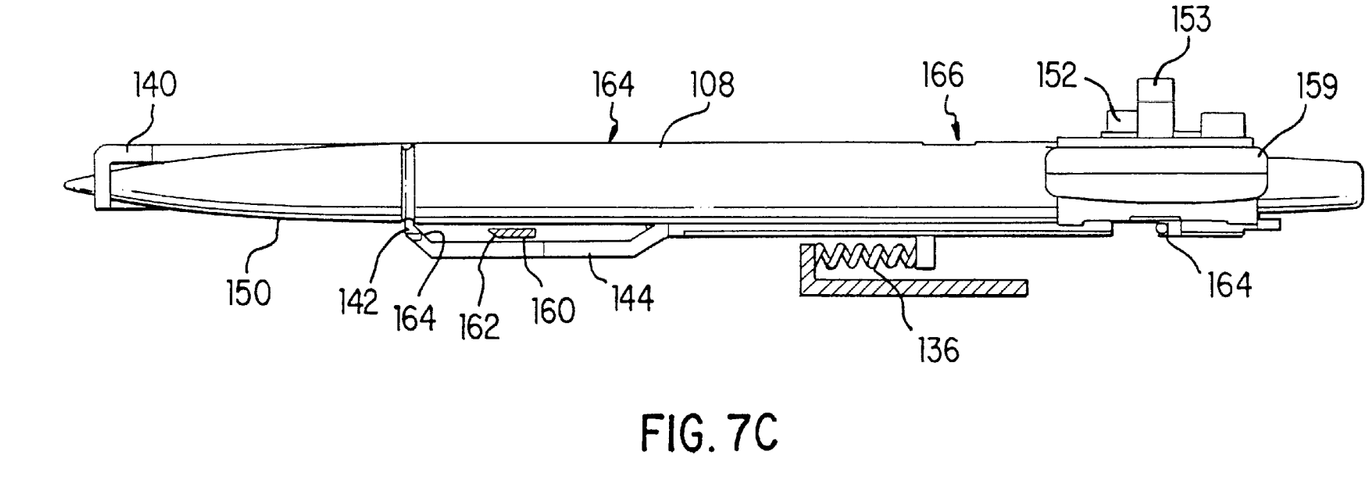

FIGS. 7A, 7B and 7C show different perspectives of the pen 108 inserted into the receptacle 109. The operation of inserting the pen 108 into the receptacle is now described. In a pen-released position, the spring 136 pushes the retaining member 130 against a peripheral sidewall (not shown) of the lower casing 102. The user inserts the pen 108, pen tip 114 first, into the chamber 132 of the receptacle 109. The pen 108 slides along the chamber surfaces as it is being inserted. A first tapered surface 150 on the pen 108 pushes the hook member 142 outwards of the chamber as the pen 108 is pushed past the hook member 142. When the groove 116 of the pen 108 is adjacent to the hook member 142, the resilient latching arm 144 causes the hook member 142 to latch onto the groove 116 to retain the pen 108 in the chamber 132. In this position of the pen 108 in the chamber 132, the pen tip 114 also protrudes a through hole 148 in the locator 140. As the pen 108 is pushed further into the chamber 132, the pen 108 drags the retaining member 130 along the chamber 132. The spring 136 is increasingly compressed as the pen 108 is pushed further inwards. As the pen 108 and retaining member 130 slide further inwards, a locking protrusion 152 on the retaining member 130 comes into contact with a locking arm 153, which is biased into the path of the locking protrusion 152. Tapered surfaces 154 and 156 on both the locking protrusion 152 and the locking arm 153 allow the inwardly moving retaining member 130 to push the locking arm 153 against its biasing (not shown) to allow the retaining member 130 to slide past the locking arm 153. When the locking protrusion 152 slides past the locking arm 153, the locking arm 153 is biased back into a locked position of the locking arm 153 to stop the retaining member 130 from ejecting out of the chamber 132. FIG. 7B shows the retaining member 130 thrusted against the locking arm 153 by a force in the spring 136. Also in this position, a back end of the pen 158 is substantially flush with the outer peripheral sidewall (not shown) of the lower casing 102.

Figure 8A:
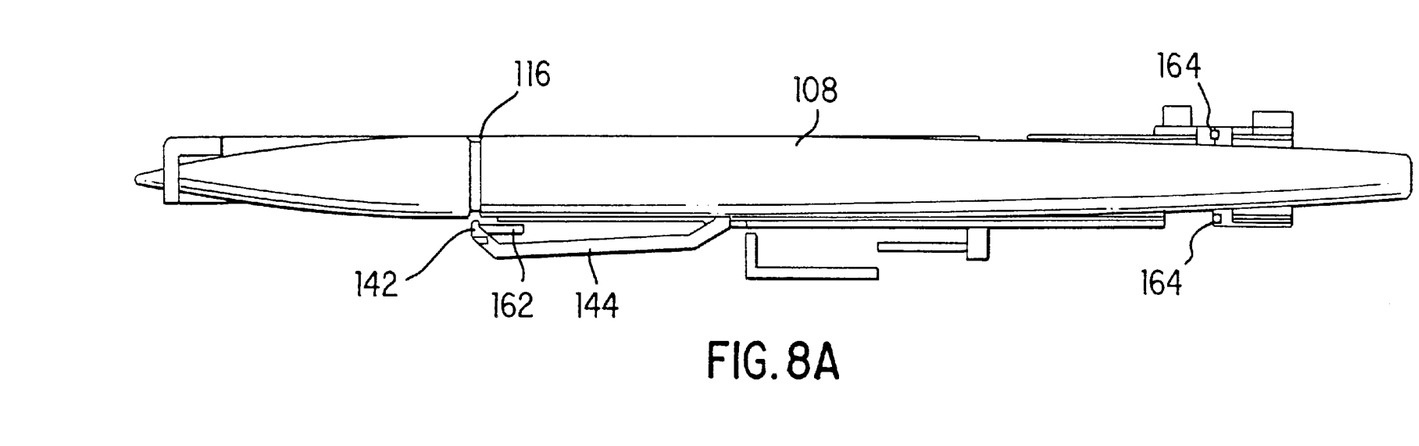
FIG. 8A is a top view of an ejecting pen which is unlatched by a retaining member.
Figure 8B:
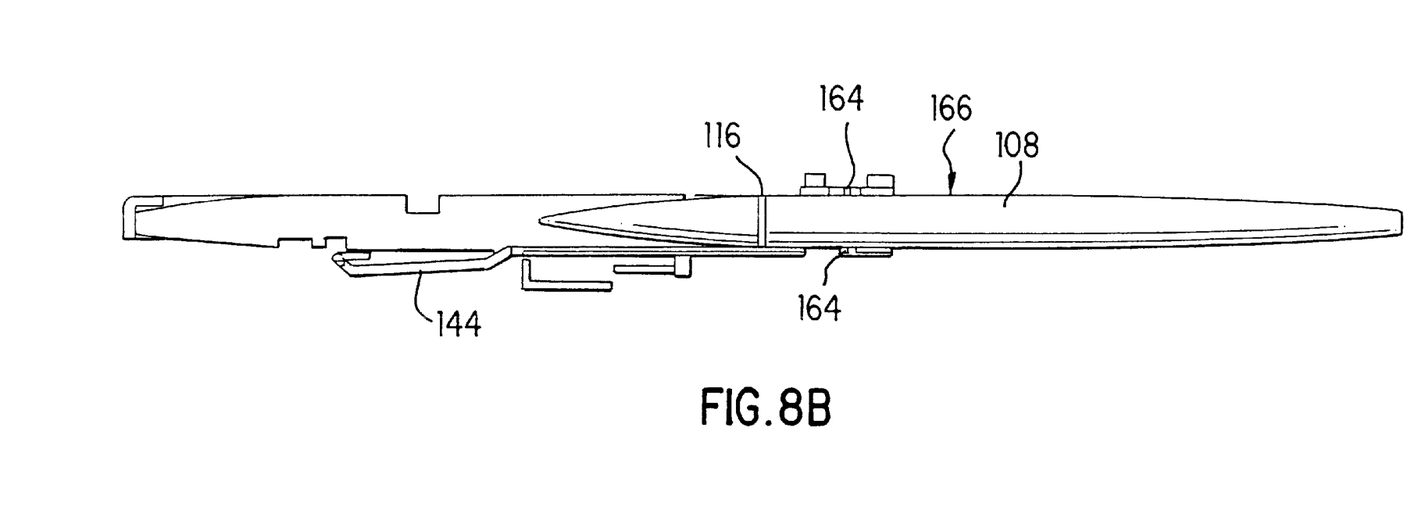
FIG. 8B is a top view of an ejecting pen brought to a rest by a pair of gripping arms.

The pen release operation is now described with the aid of FIGS. 7C, 8A and 8B. FIGS. 8A and 8B show different positions of the pen when being ejected. Integrally molded with the locking arm 153 is a pen-release button 159, preferably of ABS plastic. Two pivoting arms 160 (FIG. 2) extend axially outwards of the button 159. These pivoting arms 160 are push fitted to rest on appropriate slots (not shown) molded into a top surface of the lower casing 102. The release structure consisting of the locking arm 153 and the button 159 rotates about an axis X (FIGS. 6 and 7B). The bias (not shown) on the locking arm 153 pushes the release structure to the locked position so that the pen-release button 159 appears substantially planar with other buttons on the keyboard (not shown).

To release the pen, the user pushes the button 159 to overcome the force exerted by the locking arm bias. This action causes the locking arm 153 to move away from the locking protrusion 152 of the retaining member 130. In this pen-released position of the locking arm 153, nothing stops the retaining member 130 from ejecting out of the receptacle 109. The spring 136 thus pushes the retaining member 130 outwards. A rib 160 (FIG. 7C) depending from the first half 131 of the receptacle 109 stands in the path of the outwardly moving retaining arm 144 of the retaining member 130. When the retaining arm 144 comes into contact with the rib 160, tapered surfaces 162 and 164 on the rib 160 and the retaining arm 153 slide over each other to cause the hook member 142 to release the latch on the groove 116 of the pen 108. This unlatched position of the pen and hook member 142 is best illustrated in FIG. 8A. The collision of the hook member 142 against the rib 160 also decelerates the retaining member 130 to cause it to come to a complete rest inside the receptacle 109. The momentum in the outwardly moving unlatched pen 108 carries it further outwards. This outward movement of the pen 108 is restricted by two substantially resilient gripping arms 164 (FIG. 6) located on opposing sides of the retaining member 130. The gripping arms 164 form effectively a constriction of the chamber 132. The distance between the two arms D (FIG. 6) should be larger than the diameter of the narrow end 158 of the pen 108 and smaller than the diameter of a thicker portion 164 of the pen 108. In the outward movement of the pen 108, a portion of the tapered surface 166 will come into contact with the gripping arms 164. The gripping arms 164 exert a gripping force to produce friction on the tapered surface 166. This friction causes the pen 108 to affirmatively decelerate to a halt with a portion of the pen inside the receptacle 109 and an exposed portion of the pen outside the receptacle 109 as shown in FIG. 8B. The exposed portion allows a user to grip the pen 108 to draw it completely out of the receptacle 109.

In this embodiment, the hook member 142 is described as an integral part of the retaining member 130. This should not be construed as a limitation. For example, the hook member may be a part depending from the first half 131 of the receptacle 109 which engages the groove 116 of the pen 108 when the retaining member 130 is locked in the receptacle 109.

Second Embodiment

Figure 9A:
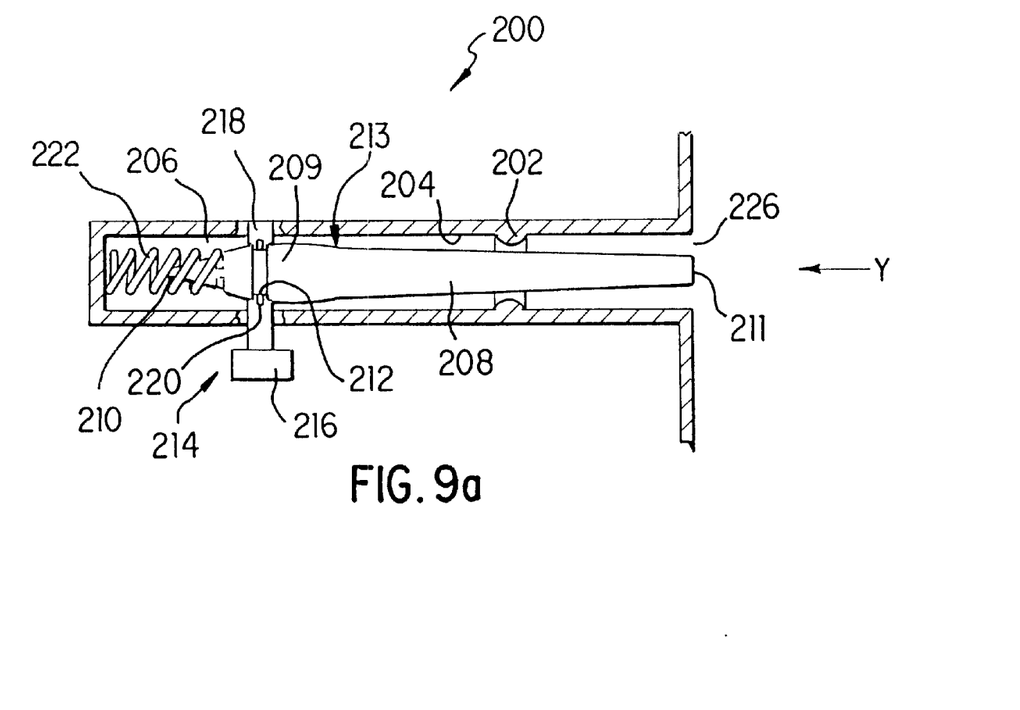
FIG. 9A is a sectional top view of a second embodiment of a pen and receptacle according to the present invention which can be used in the casing of FIGS. 5A, 5B and 5C.
Figure 9B:
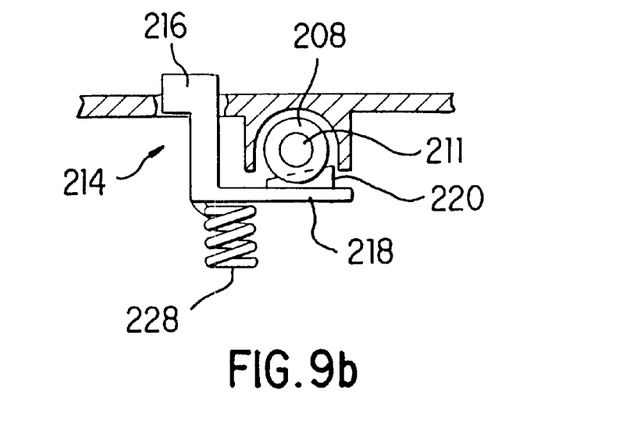
FIG. 9B is a sectional side view of the pen and receptacle taken in a direction given by an arrow Y in FIG. 9A.

A second preferred embodiment of the invention is shown in a second receptacle 200 in FIGS. 9A and 9B. A means for restricting pen movement in this receptacle 200 clearly distinguishes it from the prior art receptacle 2 shown in FIGS. 1 and 2. A constriction 202 is added to a surface 204 of a chamber 206 to restrict movement of a pen 208 in the receptacle 200. The constriction 202 may take the simple form of an annular ridge or bumps. However to increase usability, these constrictions may be made of a flexible material or spring-loaded bumps may be used.

The pen 208, according to one aspect of the invention, has an elongated body. The pen is thicker along a portion of the pen 209 which tapers off towards a pen tip 210 and a rear end 211. A tapered surface 213 of the pen between this thicker portion 209 and the rear end 211 is used to modulate the deceleration of an ejecting pen. An annular groove 212 on the pen 208 allows the pen 208 to be securely locked inside the receptacle 200 by a locking mechanism 214. The locking mechanism 214 comprises a pen-release button 216 integrally molded to a locking arm 218. A hook member 220 on the locking arm 218 engages the groove 212 on the pen 208 to lock the pen 208 in the receptacle 200.

To insert the pen 208 into the receptacle 200, a user inserts the pen 208, pen tip 210 first, into the chamber 206 of the receptacle 200. The user applies enough force initially to overcome the impeding force exerted by the constriction 202 on the pen 208. As soon as the thicker portion 209 of the pen 208 clears the constriction 202, there is no obstruction to the further insertion of the pen 208 until the pen 208 comes into contact with the hook member 220 of the locking mechanism 214. The user again applies a force to push the pen 208 further into the chamber 206. This action causes the pen 208 to push the locking arm 218 outward of the chamber 206 against a force exerted by a locking spring 228. As the pen 208 comes into contact with a spring 222 inside the receptacle 200, the user applies a stronger force to the pen 208 to push the pen 208 further into the receptacle 200. As the rear end 211 of the pen 208 becomes flush with a mouth 226 of the receptacle 200, the locking spring 228 pushes the locking arm 218 back into the chamber 206 to catch the groove 212 of the pen to lock the pen 208 in the receptacle 200. The insertion of the pen 208 in the chamber 206 compresses the spring 222 to store energy in the spring 222. This energy in the loaded spring 222 when released will cause the pen to be expelled.

To release the pen, the user pushes the release button 216 to move the hook member 220 out of the pen groove 212. The energy stored in the spring 222 forces the pen outwards relatively easily until a portion of the tapered surface 213 comes into contact with the constriction 202. This contact of the tapered surface 213 with the constriction 202 produces friction which begins to restrict the outward movement of the pen 208. The expulsion force of the spring 222 overcomes the initial frictional force applied on the tapered surface 213 by the constriction 202. This allows the pen 208 to eject out of the receptacle for a further distance of the pen before the frictional force prevails. The pen 208 then loses momentum to decelerate to a resting position with part of the pen 208 partly held in the receptacle. To draw the pen completely out of the receptacle 200, the user pulls an exposed portion of the pen with a force which overcomes the force exerted by the constriction 202 on the pen 208. This pulling action forces the thick portion 213 of the pen 208 past the constriction 202 to allow the pen 208 to be drawn completely out of the receptacle 200.

The pen is of the same material as that used with the first embodiment. The receptacle is preferably of PBT.

This receptacle 200 can also be used with a pen which is substantially cylindrical in shape where there is no tapered surface along the rear end. In such a case, the deceleration of the pen is achieved by a substantially constant frictional force exerted on a pen surface by the constriction. Nevertheless, the pen will not come to a jarring stop but will affirmatively decelerate to a rest.

I claim:

1. A receptacle for receiving and releasing a pen, the receptacle comprising:
    a chamber defined within the receptacle for receiving the pen;
    a locking means for locking the pen in the chamber when the pen is inserted into the chamber;
    an ejecting means for expelling the pen out of the chamber when the pen is locked in the receptacle;
    an unlocking means for releasing the pen to allow the ejecting means to expel the pen; and
    a restricting means for affirmatively decelerating the pen while being expelled to bring the pen to a gradual rest, wherein the restricting means is a constriction in the chamber which decelerates the ejecting pen to bring the pen to rest.

2. A receptacle for receiving and releasing a pen, the receptacle comprising:
    a chamber defined within the receptacle for receiving the pen;
    a locking means for locking the pen in the chamber when the pen is inserted into the chamber;
    an ejecting means for expelling the pen out of the chamber when the pen is locked in the receptacle;
    an unlocking means for releasing the pen to allow the ejecting means to expel the pen; and
    a restricting means for affirmatively decelerating the pen while being expelled to bring the pen to a gradual rest, wherein a portion of the pen is broader and tapers off towards a narrower end, defining a tapered surface therebetween which interacts with the restricting means to modulate the deceleration of the ejecting pen.

3. A receptacle for receiving and releasing a pen, the receptacle comprising:
    a chamber defined within the receptacle for receiving the pen;
    a retaining means for retaining the pen in the chamber when the pen is inserted into the chamber;
    a locking means for locking the retaining means inside the chamber;
    an ejecting means for expelling the pen out of the chamber when the lock on the retaining means is released;
    an unlocking means for releasing the pen to allow the ejecting means to expel the pen; and
    a restricting means for affirmatively decelerating the pen while being expelled to bring the pen to a gradual rest, and including a constriction in the chamber which decelerates the ejecting pen to bring the pen to a gradual rest.

4. A receptacle for receiving and releasing a pen, the receptacle comprising:
    a chamber defined within the receptacle for receiving the pen;
    a retaining means for retaining the pen in the chamber when the pen is inserted into the chamber;
    a locking means for locking the retaining means inside the chamber; an ejecting means for expelling the pen out of the chamber when the lock on the retaining a means is released;
    an unlocking means for releasing the pen to allow the ejecting means to expel the pen; and
    a restricting means for affirmatively decelerating the pen while being expelled to bring the pen to a gradual rest, wherein a portion of the pen is broader and tapers off towards a narrower end, defining a tapered surface therebetween which interacts with the restricting means to modulate the deceleration of the ejecting pen.

* * * * *